July 26, 1966 W. M. NEECE 3,262,717
TRAILER HITCH
Filed Oct. 21, 1964 2 Sheets-Sheet 1

INVENTOR:
WILLIAM M. NEECE
BY
Harrington A. Lackey
ATTORNEY

July 26, 1966 W. M. NEECE 3,262,717
TRAILER HITCH
Filed Oct. 21, 1964 2 Sheets-Sheet 2
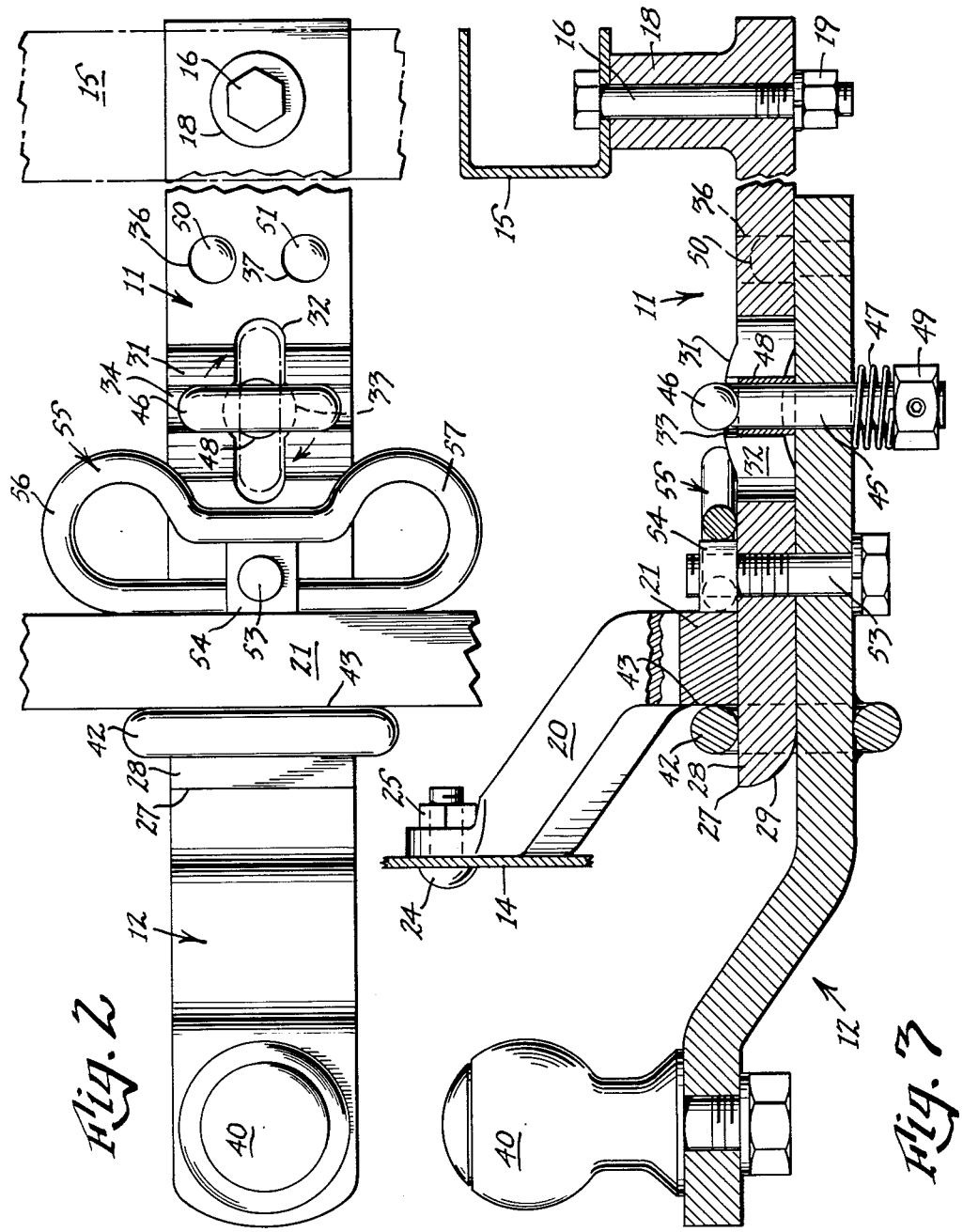
INVENTOR:
WILLIAM M. NEECE
BY Harrington A. Lackey
ATTORNEY

United States Patent Office 3,262,717
Patented July 26, 1966

3,262,717
TRAILER HITCH
William M. Neece, Columbus, Ohio
(501 W. Lytle St., Murfreesboro, Tenn. 37130)
Filed Oct. 21, 1964, Ser. No. 405,442
1 Claim. (Cl. 280—501)

This invention relates to a trailer hitch, and more particularly to a trailer hitch which may be easily detached from a motor vehicle when not in use.

The current trailer hitches employed on the rear bumpers of motor vehicles for towing trailer vehicles of various types have become substantially semi-permanent fixtures on the bumpers because of the difficulty in attaching and detaching the trailer hitches to the bumpers. This semi-permanent feature of trailer hitches is objectionable to many persons because of the unsightliness in protruding from the rear bumpers when not in use, which is most of the time.

It is therefore an object of this invention to overcome this objectionable feature by providing a trailer hitch in two parts. One part, the tongue or shoe member, may be permanently or semi-permanently attached to the vehicle beneath the vehicle and forwardly of the bumper, so that no portion of the tongue member can be seen by the ordinary observer. The other part of the trailer hitch, the hitch member including the conventional hitching element, is adapted to be quickly, easily and detachably clamped to the tongue member with the hitching element extending behind the bumper to receive the mating hitching element on the trailer vehicle. When a trailer vehicle is not being towed, the hitch member may quickly and easily be detached and stowed in the motor veheicle until its use is required again.

Another object of this invention is to provide a two-part trailer hitch, one part being permanently attached to the vthicle, the other part incorporating the hitching element, and a mechanism for detachably clamping the two parts together.

A further object of this invention is to provide a novel clamping means for rigidly securing the two assembled members in a two-part trailer hitch, which will readily accommodate the various thrusts and stresses to which a trailer hitch is subjected.

Further objects and advantages of the invention will be apparent from the following description taken in conjunction with the drawings, wherein:

FIG. 2 is a fragmentary top plan view of the invention with the shoe member and hitch member assembled; and FIG. 3 is a longitudinal section taken through the center of the shoe and hitch members of FIG. 2.

Figure 1:
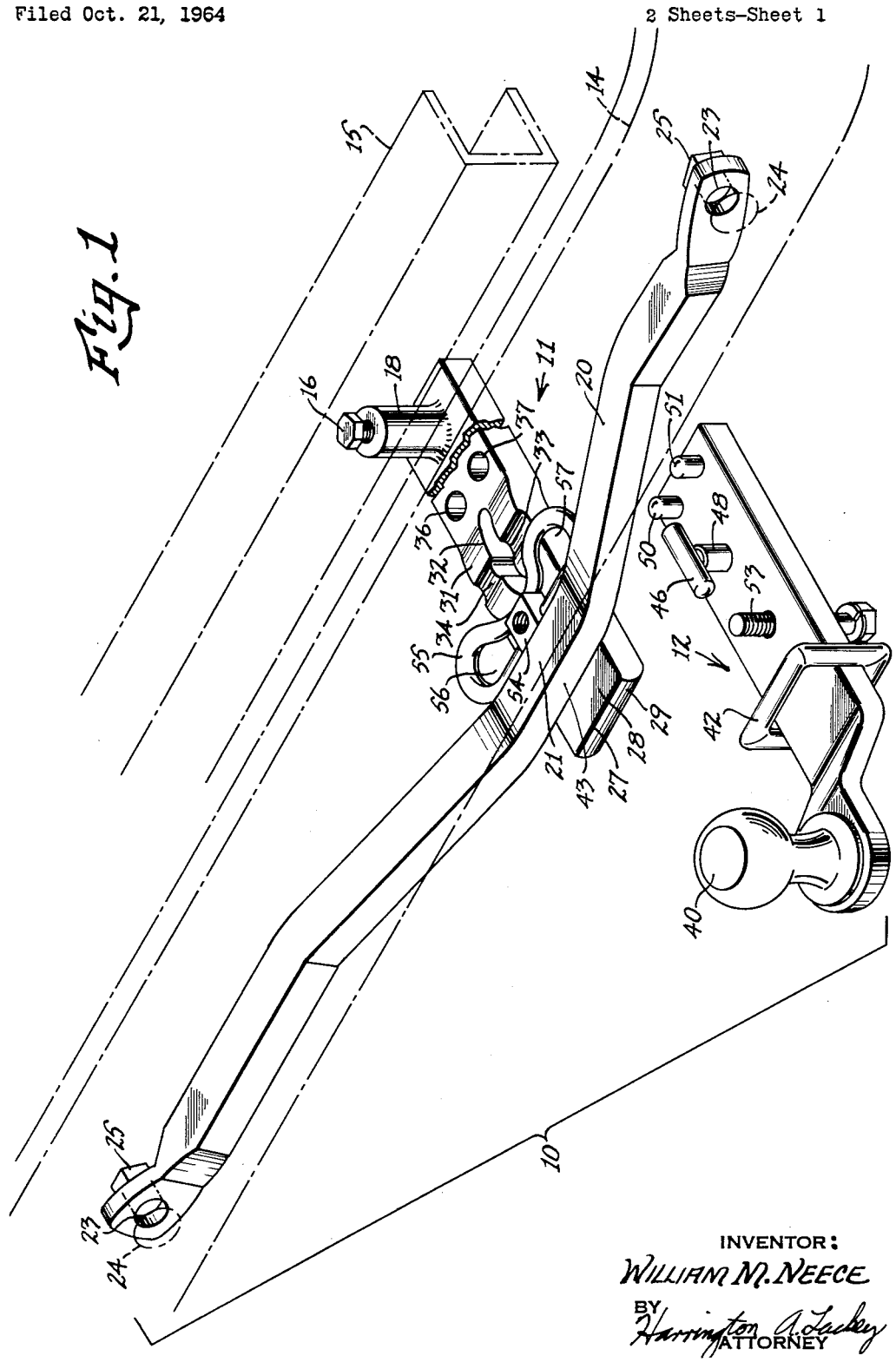
FIG. 1 is an exploded perspective view of the invention showing the shoe member and hitch member disassembled and part of the motor vehicle in phantom.

Referring now to the drawings in more detail, FIG. 1 discloses the trailer hitch 10 disassembled into two parts, an elongated tongue or shoe member 11 and an elongated hitch member 12. The shoe member 11 may be rigidly secured to the bottom of the motor vehicle in front of the bumper 14 by any convenient means. As illustrated in the drawings, the front portion of the shoe member 11 is fixed to a transverse channel 15 on the vehicle chassis by a bolt 16 extending through the lower flange of the channel 15 and through an opening in a boss 18 extending upwardly from the forward portion of the shoe member 11. The bolt 16 is secured by nut 19. It will be understood that the boss 18 may be higher or lower or eliminated, or the forward portion of the shoe member 11 may be extended forward a considerable distance until it will engage and be secured to an appropriate frame member of the chassis, depending upon the make of the vehicle.

The rear portion of the shoe member 11 is preferably secured to the bumper 14 by means such as the winged bar 20, the middle portion 21 of which is welded or otherwise fixedly secured to the upper surface of the shoe member 11. The extremities of the bar 20 may be provided with holes 23 through which bolts 24 may extend to be secured by nuts 25 to the bumper 14. Other types of securing means may be employed instead of the bar 20, so long as the rear edge 27 of the shoe member 11 is spaced forward of the bumper 14 so the entire shoe member 11 will be completely concealed from view of the ordinary observer.

Both the shoe member 11 and hitch member 12 are elongated bars or straps having rectangular cross-sections, and both preferably being of equal width and equal thickness.

The rear of the toe portion 28 of the shoe member 11 is curved from the top rear edge 27 downwardly and forwardly convex to form a rocking or rolling surface 29.

The middle portion of shoe member 11 is provided with a raised curved surface 31 through which is formed an elongated slot 32. The middle portion of the slot 32 is provided with opposed vertically disposed cylindrical recesses 33. A transverse groove 34 is formed in the raised surfaces 31 across the middle of the elongated slot 32 and intercepting the recesses 33.

Spaced forwardly of the elongated slot 32 and symmetrical about the longitudinal axis of the shoe member 11, are a pair of cylindrical holes or apertures 36 and 37.

Supported on the rear end of the hitch member 12 is a conventional hitching element such as the knob 40, which is adapted to engage a cooperating hitching element on the tongue of a trailer vehicle.

Spaced in front of the hitching element 40 is a recessed member, such as a stirrup bracket or band 42. This particular band 42 extends completely around the hitch member 12 and is welded to the bottom thereof to form an opening with the top surface of the hitch member 12 for receiving the toe portion 28, as disclosed in FIGS. 2 and 3. It will also be noted that the middle portion 21 of the bar 20 form an abutment surface 43 spaced a short distance forwardly of the rear edge 27 to limit the forward movement of the hitch member 12 relative to the shoe member 11, and also to provide a guide for registering other cooperating elements between the hitch member 12 and the shoe member 11.

Adapted to cooperate with the slote 32 is a clamping pin or rod 45, its top end comprising a transverse bar 46 to form a T member. The clamping pin 45 is supported in the hitch member 12 for both rotational and longitudinal or axial movement. A spring 47 is mounted on the bottom of pin 45 to urge the cross bar 46 toward the hitch member 12 and against the sleeve 48. Thus, when the cross bar 46 is aligned with the slot 32, it is unlocked and the hitch member 12 may be readily detached from the shoe member 11. However, when the cross bar 46 is raised above the sleeve 48, and rotated across the raised curved surface 31 until it engages the groove 34, the hitch member 12 and the shoe member 11 are then locked together. The spring 47 biases the cross bar 44 into engagement with the groove 34. The raised curved surface 31 provides a means for camming the cross bar 46 upward when it is rotated so that it will lock in the groove 34. The cylindrical recesses 33 are provided to accommodate the pin 45.

A pair of draw pins 50 and 51 are rigidly secured to the hitch member 12 to project upwardly for insertion through the holes 36 and 37. The holes 36 and 37 provide a very snug fit for the draw pins 50 and 51 so that the longitudinal thrust of the motor vehicle is transmitted from the shoe member 11 through the draw pins 50 and 51 to the hitch member 12 and ultimately to the trailer vehicle, not shown.

When the hitch member 12 and shoe member 11 are properly assembled, the thrust is carried by the draw pins 50 and 51 and the stirrup band 42 engaging the abutment surface 43. Thus, no thrust strain is placed on the locking or clamping pin 45, so that its sole function is to clamp the shoe member 11 and hitch member 12 securely together. As an optional safety feature, and as an additional means of relieving strain on the clamping pin 45, a bolt 53 may extend through registering openings in the hitch member 12 and shoe member 11 and be threadedly secured by a nut 54, rigidly secured to the front face of the middle bar portion 21.

A looped rod member 55 having loops 56 and 57 may also be fixed to the top surface of the shoe member 11 about the nut 54 to provide means for securing the conventional safety chains attached to the trailer hitch element, not shown.

In operating the invention, the shoe member 11 is first secured to the bottom of the vehicle. As illustrated in this embodiment of the invention, the bolt 16 is extended through the bottom flange of the channel 15 through the opening of the boss 18 and secured by nut 19. Bolts 24 are introduced through openings in the bumper 14 registering with the holes 23 and secured by nuts 25. In this manner, the shoe member 11 is rigidly and permanently secured to the bottom of the vehicle with the rear edge 27 spaced forwardly of the bumper 14 so that the entire shoe member 11 is concealed from the view of the ordinary observer. The shoe member 11 remains in this position whether the trailer hitch 10 is employed to draw a trailer vehicle, or not.

When it is desired to draw a trailer vehicle, the hitch member 12 is clamped to the shoe member 11 by aligning the stirrup band 42 with the toe portion 28 and tilting the knob 40 upwardly, if desired, as the toe portion 28 is introduced through the opening formed by the band 42. The hitch member 12 is then thrust forwardly and pivoted downwardly about surface 29, if desired, until the upper portion of the band 42 engages the abutment surface 43, and the top surface of the hitch member 12 abuts flush against the bottom surface of the shoe member 11, as disclosed in FIG. 3. In this position, the draw pins 50 and 51 automatically register with and enter their corresponding holes 36 and 37 in shoe member 11. Before assembling, the cross bar 46 is longitudinally aligned with the slot 32, as disclosed in FIG. 1. Thus, as the hitch member 12 swings up into engagement with the shoe member 11, the cross bar 46 passes through the slot 32. In the assembled position, a wrench may be employed to engage and rotate the nut 49 and the clamping pin 45 in either direction, 90 degrees, until the cross bar 46 has ridden up upon the raised surface 31 and dropped into engagement with the groove 34 to completely lock the shoe member 11 and hitch member 12 together.

If the optional bolt 53 and nut 54 are employed, then the bolt 53 is inserted through its corresponding openings in the members 11 and 12, and threaded in the nut 54 to provide additional stability and strength.

Although it is possible to use only a single draw pin mounted on the longitudinal axis of the hitch member 12, instead of the draw pins 50 and 51, two draw pins are preferred in order to provide additional strength and afford lateral stability.

It is also preferred to mount the draw pins 50 and 51 as far forward as possible so that the arc through which the pins 50 and 51 swing when the hitch member 12 is pivoting about the toe portion 28, will approach a straight line, and therefore permit the inner diameters of the holes 36 and 37 to approximate as closely as possible the diameters of draw pins 50 and 51 to afford as snug a fit as possible.

When the trailer hitch 10 is no longer employed to draw a trailer vehicle, the hitch member 12 may be readily detached by first removing the bolt 53 from the nut 54, and then with a wrench turning the nut 49 through 90 degrees, causing the cross bar 46 to cam up out of the groove 34 and downwardly across the raised curved surface 31 until the cross bar 46 is in alignment with the slot 32. The hitch member 12 is then rotated in a vertical plane about the toe portion 28 until the draw pins 50 and 51 have cleared the holes 36 and 37, and the hitch member 12 is moved rearwardly until the toe portion 28 is removed from the stirrup band 42. The hitch member 12 is then stowed in the trunk of the car or any other part of the vehicle until it is needed for use again. In this manner, the unsightly appearance of the protruding hitching element 40 is eliminated from the rear end of the vehicle when it is not in use.

It will be apparent to those skilled in the art that various changes may be made in the invention without departing from the spirit and scope thereof, and therefore the invention is not limited by that which is shown in the drawing and described in the specification, but only as indicated in the appended claim.

What is claimed is:

A trailer hitch for a motor vehicle having a rear bumper comprising:
(a) an elongated shoe member having a rear edge,
(b) means for fixing said shoe member beneath said vehicle, said rear edge being spaced forward of said rear bumper,
(c) an abutment surface projecting vertically from said shoe member and spaced adjacent to and forward of said rear edge to form an exposed, rearwardly projecting toe portion between said abutment surface and said rear edge,
(d) an elongated hitch member having a front end and a rear end,
(e) a hitching element mounted adjacent the rear end of said hitch member,
(f) a recessed member on said hitch member spaced forwardly of said hitching element and having an opening for receiving said toe portion and for guiding said hitch member into longitudinal overlapping engagement with said shoe member in operative position,
(g) said abutment surface engaging said recessed member in operative position to limit the forward movement of said hitch member relative to said shoe member in order to locate said hitching element rearwardly of said rear bumper,
(h) means spaced forwardly of said abutment surface to rigidly and detachably clamp said shoe member and said hitch member in operative position,
(i) at least one draw pin fixed on said hitch member, spaced forwardly of said clamp means and projecting toward said shoe member in operative position,
(j) a registering opening formed in said shoe member for snugly receiving each draw pin in operative position,
(k) said toe portion having a convex surface opposing said hitch member for rocking engagement into operative position as said toe portion is received in said recessed member, to permit the introduction of each draw pin into said corresponding registering opening.

References Cited by the Examiner

UNITED STATES PATENTS

| | | | |
|---|---|---|---|
| 1,820,925 | 9/1931 | Toncray | 24—221 |
| 2,177,215 | 10/1939 | Hodgkinson | 24—221 X |
| 2,856,204 | 10/1958 | Graham | 280—491 |
| 2,873,982 | 2/1959 | Graham | 280—478 |
| 2,877,025 | 3/1959 | Jay | 280—495 |
| 2,916,302 | 12/1959 | Lippitt | 280—491 |
| 3,159,393 | 12/1964 | Villano | 24—221 X |

BENJAMIN HERSH, *Primary Examiner.*

C. C. PARSONS, *Assistant Examiner.*